United States Patent
Wendt

(10) Patent No.: US 11,489,927 B2
(45) Date of Patent: *Nov. 1, 2022

(54) COMMUNICATION HANDLING

(71) Applicant: Comcast Cable Communications, LLC, Philadelphia, PA (US)

(72) Inventor: Christopher A. Wendt, Exton, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 406 days.

This patent is subject to a terminal disclaimer.

(21) Appl. No.: 15/973,733

(22) Filed: May 8, 2018

(65) Prior Publication Data

US 2019/0052723 A1     Feb. 14, 2019

Related U.S. Application Data

(63) Continuation of application No. 13/198,880, filed on Aug. 5, 2011, now Pat. No. 9,998,560.

(51) Int. Cl.
*G06F 15/177* (2006.01)
*H04L 67/306* (2022.01)
*H04L 67/63* (2022.01)

(52) U.S. Cl.
CPC ............ *H04L 67/306* (2013.01); *H04L 67/63* (2022.05)

(58) Field of Classification Search
CPC ......... H04M 3/436; H04M 2203/2072; H04M 3/54; H04M 2203/2005; H04Q 3/76; H04L 67/306; H04L 67/327

See application file for complete search history.

(56) References Cited

U.S. PATENT DOCUMENTS

| | | | | |
|---|---|---|---|---|
| 6,310,947 | B1* | 10/2001 | Polcyn | H04Q 3/62 379/207.02 |
| 7,257,213 | B1* | 8/2007 | Laljiani | H04M 3/42195 379/221.09 |
| 7,804,953 | B1 | 9/2010 | Antonios et al. | |
| 2002/0019246 | A1* | 2/2002 | Forte | H04M 3/54 455/555 |
| 2005/0201533 | A1* | 9/2005 | Emam | H04M 3/53383 379/88.19 |
| 2005/0249193 | A1 | 11/2005 | Epley | |
| 2006/0023695 | A1* | 2/2006 | Yarlagadda | H04M 15/41 370/352 |

(Continued)

*Primary Examiner* — Dustin Nguyen
*Assistant Examiner* — Hao H Nguyen
(74) *Attorney, Agent, or Firm* — Banner & Witcoff, Ltd.

(57) ABSTRACT

An apparatus, method, system and computer-readable medium are provided for abstracting a public facing identity associated with one or more devices, such as user devices. In some embodiments, a unique identity may be associated with a device. A mapping may be used to establish a relationship between the public facing identity and the unique identity. In some embodiments, configuration data may indicate how a communication (e.g., an incoming or outgoing communication) is to be handled or routed. For example, the configuration data may indicate preferences as to which device(s) amongst a plurality of devices is to receive an incoming communication and/or which public facing identity/identities amongst a plurality of public facing identities is to be used in transmitting an outgoing communication.

20 Claims, 5 Drawing Sheets

(56) References Cited

U.S. PATENT DOCUMENTS

| | | |
|---|---|---|
| 2006/0093117 A1 | 5/2006 | Agrawal et al. |
| 2006/0250989 A1 | 11/2006 | Wengrovitz |
| 2007/0121855 A1* | 5/2007 | Tiliks .................. H04M 3/38 |
| | | 379/142.01 |
| 2007/0224979 A1 | 9/2007 | O'Neal et al. |
| 2009/0075638 A1* | 3/2009 | Link, II .............. H04M 3/54 |
| | | 455/417 |
| 2009/0279683 A1* | 11/2009 | Gisby ................ H04M 3/465 |
| | | 379/211.01 |
| 2010/0020952 A1 | 1/2010 | Leung et al. |
| 2010/0098234 A1* | 4/2010 | Ku .................. H04M 3/42008 |
| | | 379/210.02 |
| 2011/0047279 A1* | 2/2011 | Lederer ............ H04M 3/436 |
| | | 709/228 |
| 2011/0072154 A1* | 3/2011 | Bogdanovic ........ H04L 67/28 |
| | | 709/238 |
| 2012/0005282 A1 | 1/2012 | Steinbok et al. |
| 2013/0005315 A1* | 1/2013 | Lemke ............ H04M 3/42195 |
| | | 455/415 |

* cited by examiner

COMMUNICATION HANDLING

CROSS-REFERENCE TO RELATED APPLICATIONS

This application is a continuation of and claims priority to co-pending U.S. application Ser. No. 13/198,880, filed Aug. 5, 2011, entitled "Communication Handling," the contents of which are hereby incorporated by reference in their entirety.

BACKGROUND

Advancements in computer technology have changed the way people interact with one another and how people go about their daily lives.

Users frequently own, or have associated with them, more than one user device. For example, a user may have a mobile phone, a television, a personal computer, a PDA, etc. This disclosure identifies and addresses concerns related to flexibility in terms of communication handling with respect to multiple user devices, among other things.

SUMMARY

This summary is not intended to identify critical or essential features of the disclosure provided herein, but instead merely summarizes certain features and variations thereof.

In some embodiments, a public facing identity may be abstracted or serve as a virtual representation of one or more user devices. For example, a public telephone number may be associated with two or more devices, and the two or more devices may be associated with unique identities. A unique identity may be associated with a service provider. A unique identity may distinguish a first user device from a second user device. A unique identity may be private or secret.

In some embodiments, the public facing identity may facilitate communications in any number of directions. For example, a public telephone number may support bi-directional communications (e.g., incoming and outgoing telephone calls).

In some embodiments, a user may provide or establish one or more preferences with respect to communication routing or handling. For example, a user may indicate that an incoming telephone call is to be routed to one or more devices based on configuration data or one or more rules. The user may provide that an outgoing telephone call originating from one or more user devices is to be associated with a particular public telephone number, optionally based on configuration data or one or more rules. In some embodiments, user preference(s) may be stored in connection with one or more profiles, such as a user profile. In some embodiments, user preference(s) may be used to establish or modify a routing matrix.

Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Various connections between elements are discussed in the following description. These connections are general and, unless specified otherwise, may be for example direct or indirect, wired or wireless, and this specification is not intended to be limiting in this respect.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
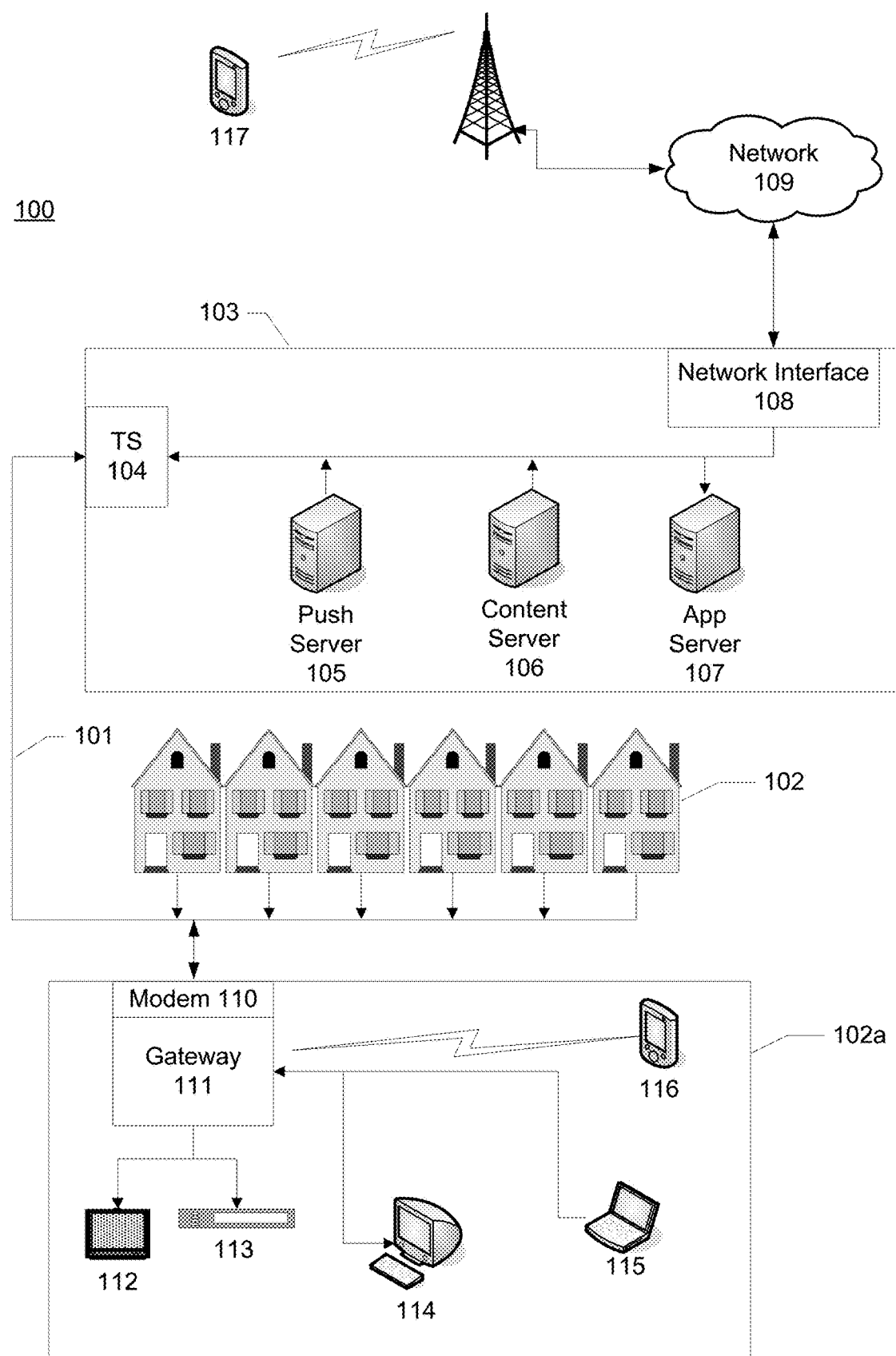
FIG. 1 illustrates an example information distribution network.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths.

The central office 103 may include a termination system (TS) 104, such as a cable modem termination system (CMTS), which may be a computing device configured to manage communications between devices on the network of lines 101 and backend devices such as servers 105-107 (to be discussed further below). The termination system (TS) may be as specified in a standard, such as the Data Over Cable Service Interface Specification (DOCSIS) standard, published by Cable Television Laboratories, Inc. (a.k.a. CableLabs), or it may be a similar or modified device instead. The termination system (TS) may be configured to place data on one or more downstream frequencies to be received by modems at the various premises 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications) . The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central location 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide or interactive program guide listings. Another application server may be responsible for monitoring user viewing habits and collecting that information for use in selecting advertisements. Another application server may be responsible for formatting and inserting advertisements in a video stream being transmitted to the premises 102. Another application server may be responsible for receiving user remote control commands, and processing them to provide an intelligent remote control experience.

An example premises 102a may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the premises 102a to communicate with the central office 103 and other devices beyond the central office. The gateway 111 may be a set-top box (STB), digital video recorder (DVR), computer server, or a combination thereof, or any other desired computing device. The gateway 111 may also include (not shown) local network interfaces to provide communication signals to devices in the premises 102a, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
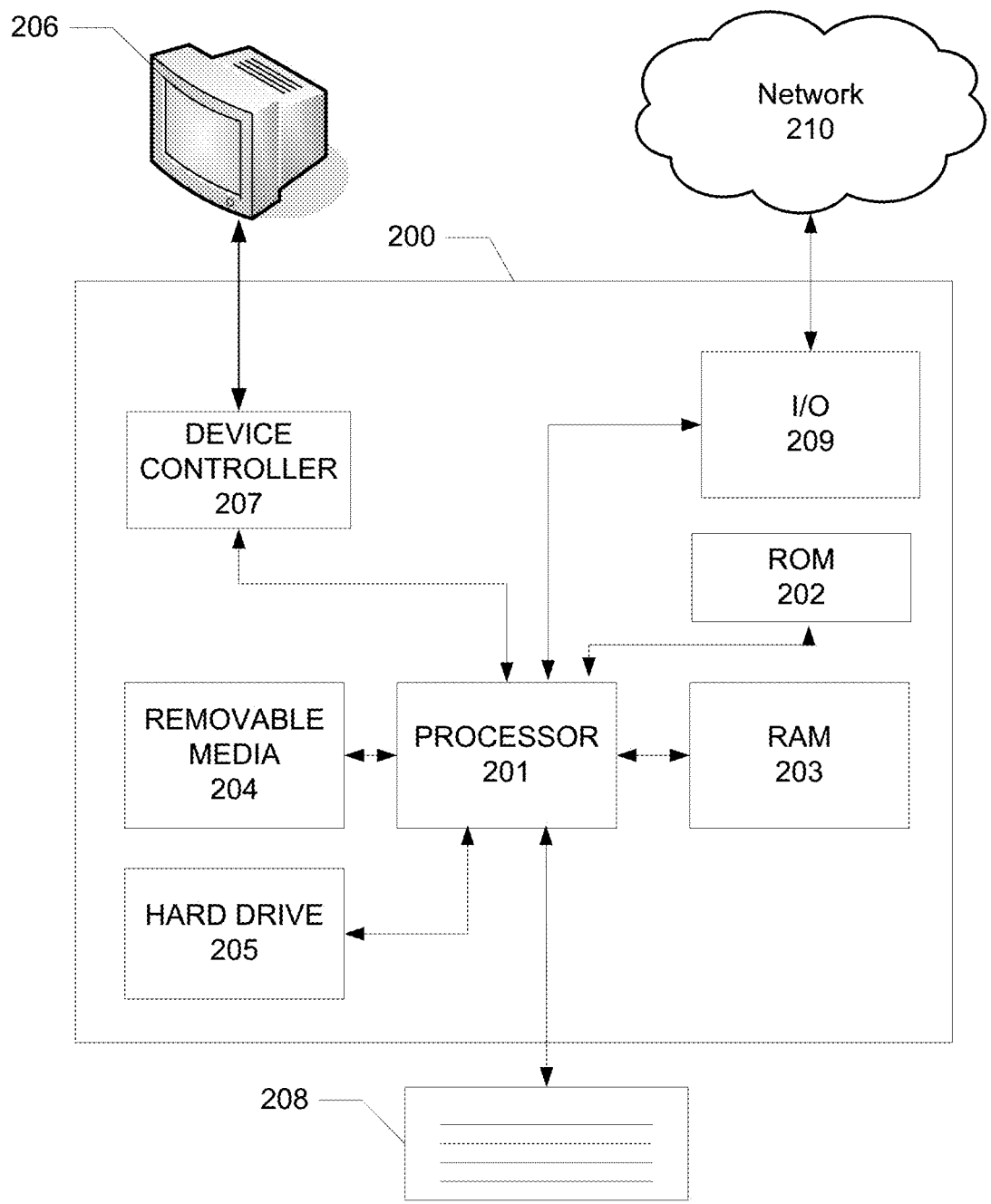
FIG. 2 illustrates an example platform on which the various elements described herein can be implemented.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

By way of introduction, aspects of this disclosure may be implemented to selectively route or handle communications, such as incoming or outgoing communications. In some embodiments, a public facing identity (e.g., a telephone number, an email address, an instant messenger handle, a username or login name) may be abstracted, or associated with a particular user or entity, so as to represent one or more user devices. The user devices may have unique identities. For example, a first user device may have a first unique identity and a second user device may have a second unique identity that is different from the first unique identity. The unique identities may be used to distinguish user devices (e.g., to distinguish the first user device from the second user device).

Figure 3:
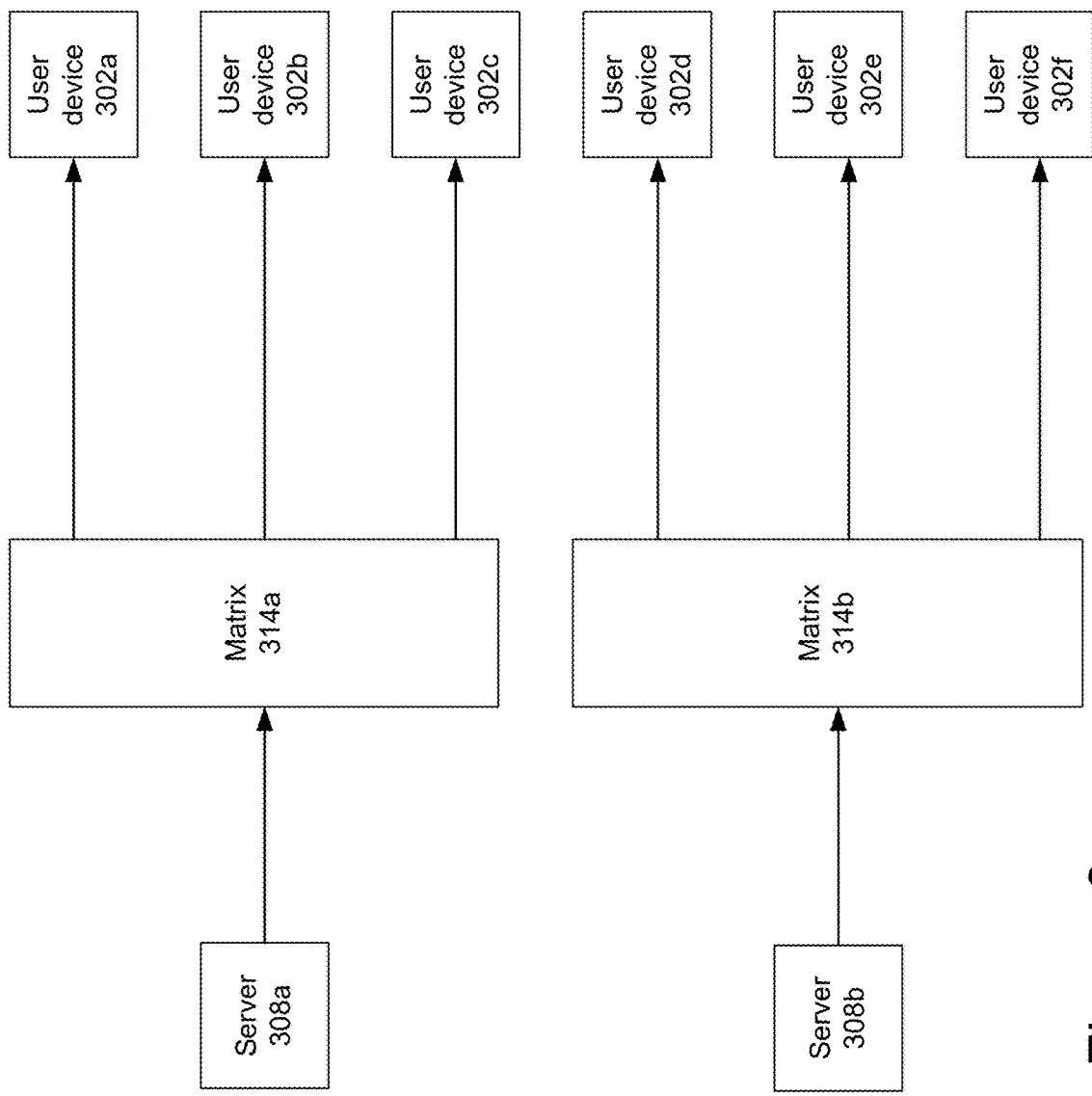
FIGS. 3-4 illustrate architectures suitable for demonstrating one or more aspects of this disclosure.
Figure 4:
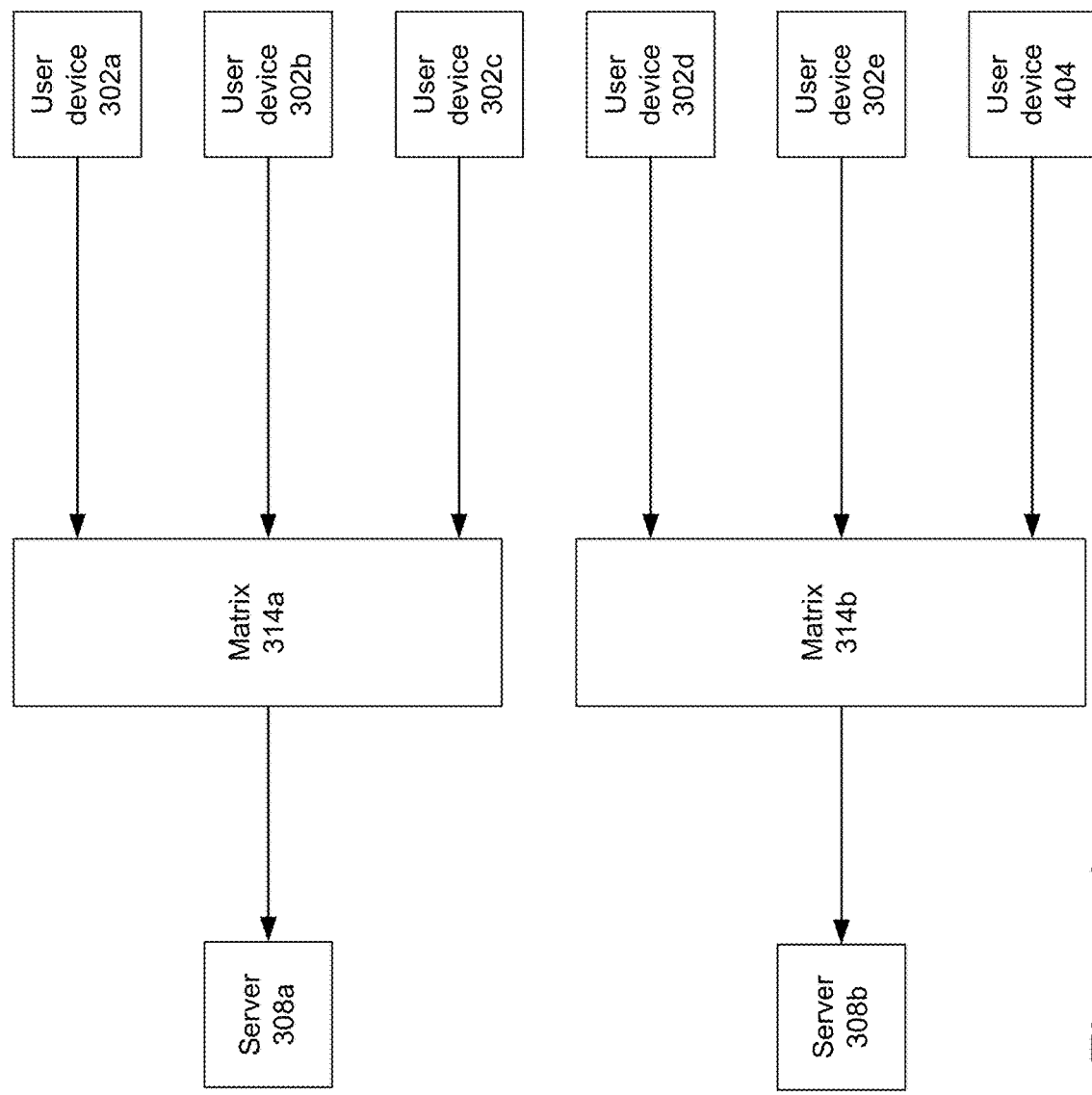

FIGS. 3-4 illustrate architectures that may be used to demonstrate one or more aspects of this disclosure. One or both of the architectures shown in FIGS. 3-4 may be used or operated in connection with one or more environments, such as the environments described above in connection with FIGS. 1-2.

The architecture shown in FIG. 3 may be used to route or handle an incoming communication (e.g., a terminating or incoming phone call). The architecture shown in FIG. 4 may be used to route or handle an outgoing communication (e.g., an originating or outgoing phone call). In some embodiments, the architectures of FIGS. 3 and 4 may be combined. For example, the architectures of FIGS. 3 and 4 may be combined to support bi-directional communications.

In FIG. 3, a number of user devices 302 (namely, devices 302a through 302f) are shown. User devices 302 may be any type of user device or combination of user devices, such as an embedded digital voice adaptor (E-DVA) device (e.g., a modem, such as a cable modem), a WiFi client, a smartphone, a personal computer (PC), a digital enhanced cordless telecommunications (DECT) device, a pager, etc. One or more of devices 302a-302f may be connected to or coupled to additional devices not shown in FIG. 3. Moreover, the types of user devices described above are illustrative. Any number or type of user device(s) may be used in some embodiments, optionally supporting any type of communication.

Devices 302a-302c may be associated with a first public facing identity. For example, devices 302a-302c may be associated with a telephone number, such as XXX-XXX-XXX1. Devices 302d-302f may be associated with one or more additional public facing identities. For example, devices 302d-302f may be associated with telephone numbers, such as XXX-XXX-XXX2 and XXX-XXX-XXX3. Devices 302a-302c may be associated with a first user (e.g., a user named John Doe), and devices 302d-302f may be associated with a second user (e.g., a user named Bob Black).

Also shown in FIG. 3 are servers 308a and 308b. Server 308a may provide service to devices 302a-302c. Server 308b may provide service to devices 302d-302f. While two servers (308a and 308b) are shown in FIG. 3, any number of servers may be used in one or more embodiments. Also, additional devices not shown in FIG. 3 may be included in some embodiments. For example, routers and switches that may connect or couple servers 308 and user devices 302 may be included in some embodiments.

Two matrices, 314a and 314b, are shown in FIG. 3. While shown as separate and distinct entities, in some embodiments a matrix (e.g., matrix 314a) may be included in a server (e.g., server 308a) or any other device. Moreover, while two matrices are shown in FIG. 3, any number of matrices may be used in some embodiments.

Matrices 314 may be used to selectively route communications. For example, matrix 314a may selectively route an incoming communication (e.g., an incoming phone call) received at server 308a from server 308a to one or more of user devices 302a-302c. Matrix 314b may selectively route an incoming communication (e.g., an incoming phone call) received at server 308b from server 308b to one or more of user devices 302d-302f.

In terms of how to route an incoming communication, a matrix 314 may store, or otherwise obtain access to, configuration data or rules. The configuration data may initially be set up with default values. For example, default values for the configuration data of matrix 314a may specify that an incoming phone call directed to phone number XXX-XXX-XXX1 is to be directed to user device 302a, and if the user does not answer the phone call on device 302a, then the phone call is to be directed to user device 302b, and if the user does not answer the phone call on device 302b, then the phone call is to be directed to user device 302c. In another example, default values for the configuration data of matrix 314a may specify that an incoming phone call directed to phone number XXX-XXX-XXX1 should be simultaneously directed to devices 302a-302c, thereby allowing the first of devices 302a-302c that is activated or otherwise accepts the phone call to handle the communication.

Default values for the configuration data may be modified by, or supplemented with, values provided by one or more users. For example, a user may provide information that may be used to establish or modify the user's preferences, optionally as part of a registration process or as an update to a registration process. Referring to Table 1 below, a user may specify how an incoming communication is to be handled based on user preference categories. For example, based on the values shown in Table 1, the user (e.g., John Doe) may specify that devices 302a-302c are eligible to receive an incoming phone call, that the incoming phone call should be directed to device 302a between the hours of 8 AM and 6 PM Monday through Friday, that on Saturdays between 12 AM and 2:45 PM an incoming phone call should be directed to device 302b so long as device 302b is powered on (or based on some other type of device status) and located within 50 yards of the John Doe's premises (e.g., premises 102a of FIG. 1), and that otherwise the incoming call should be directed to device 302c. The term 'N/A' shown in Table 1 means 'not applicable.'

TABLE 1

EXAMPLE INCOMING COMMUNICATION USER PREFERENCES

| | DEVICE | | |
|---|---|---|---|
| | 302a | 302b | 302c |
| Eligible to receive? | X | X | X |
| Hours eligible to receive | 8AM-6PM | 12AM-2:45PM | All (12AM-11:59:59PM) |
| Days eligible to receive | Monday-Friday | Saturday | All (Sunday-Saturday) |
| Device must be powered on to receive? | No | Yes | No |
| Max distance from premises | N/A | 50 yards | N/A |

Similar tables can be constructed for other types of incoming communications (e.g., instant messages, emails, audio messages (e.g., songs), video conferencing, etc.). The values shown in Table 1 are illustrative. Other values may be used. Furthermore, the preference categories are also illustrative. In some embodiments, additional or different preference categories may be used. For example, a device's capabilities (e.g., a device's audio capabilities) may be used to determine whether a phone call should be routed to the device—e.g., John Doe might not want to take calls made during business hours on device 302c due to device 302c having lower quality speakers. A user's status may be used to determine whether to route an incoming phone call to a particular device. For example, if John Doe's social networking page indicates that John Doe is at work, a phone call may be routed to device 302a (potentially irrespective of any other values entered for any other category). Other variations are within the scope and spirit of this disclosure.

In some embodiments, a user's preferences may be associated with configuration information of matrix 314a. In this manner, matrix 314a may determine which device(s) (e.g., devices 302a-302c) to route an incoming communication (e.g., an incoming phone call) to based on the user's preferences.

In some embodiments, devices 302a-302c may have associated with them unique identities to facilitate routing of incoming communications. For example, the unique identities may distinguish a first device (e.g., device 302a) from the other devices (e.g., devices 302b and 302c). The unique identities may take an alphanumeric form and may include an indication of a user and a service provider. For example, if John Doe is associated with devices 302a-302c, and John receives service from the ServiceProvider1 Company, device 302a may have a unique identity of "johndoe1@serviceprovider1.net". Similarly, device 302b may have a unique identity of "johndoe2@ serviceprovider1.net" and device 302c may have a unique identity of "johndoe3@serviceprovider1.net". Of course, the values for the unique identities provided are illustrative, and any other form or technique for uniquely identifying a first device from other devices may be used. In some embodiments, a device (e.g., device 302a) may have more than one unique identity associated with it. In some embodiments, the unique identities may adhere to the session initiation protocol (SIP). For example, in some embodiments, a formatting of one or more unique identities may adhere to a SIP uniform resource identifier (URI). The SIP URI may incorporate a telephone number or any other combination of symbols, characters (e.g., alphanumeric characters), etc. In some embodiments, communication protocols or standards different from SIP may be used, possibly in combination with one another and/or in combination with SIP.

In some embodiments, a matrix (e.g., matrix 314a) may store, or otherwise access, the unique identities.

The unique identities may provide for privacy or secrecy with respect to the user's devices. Privacy may be based on the unique identity not being (or not including) a public facing identity. Continuing the above example, if an acquaintance of John Doe (named Carol Caller) wants to call John Doe, Carol may simply call John Doe's public telephone number (e.g., XXX-XXX-XXX1). Unless John Doe volunteers the information to Carol, Carol might be unaware: (1) that John Doe has three devices (e.g., devices 302a-302c), and/or (2) that John Doe answered the phone call from Carol using any particular device (e.g., device 302a).

The unique identities may be used to streamline the calling process from Carol's perspective. For example, and assuming that Carol knows that John Doe has more than one device, Carol might not have to remember, or keep a record of, (1) different phone numbers for each of the devices, and/or (2) John Doe's preferences as to which device John wants to receive a call on at any particular moment in time. The use of unique identities may help to preserve the quantity of public facing identities (e.g., public telephone numbers) that are available in a pool of identities provided by the service provider.

While discussed above in the context of a single phone number (XXX-XXX-XXX1), in some embodiments (a subset of) devices 302a-302c may be associated with more than one phone number. For example, devices 302a and 302b may be associated with phone number XXX-XXX-XXX4 in addition to phone number XXX-XXX-XXX1.

Examples similar to those described above in connection with John Doe, devices 302a-302c, server 308a, and matrix 314a may be constructed for second user Bob Black in connection with devices 302d-302f, server 308b, and matrix 314b with respect to a (second) incoming communication (e.g., a (second) incoming phone call).

FIG. 4 shows an architecture that is similar to FIG. 3. As described above, the architecture shown in FIG. 4 may be used to support outgoing communications (e.g., an outgoing phone call) from user devices to matrices 314 and servers 308. Relative to FIG. 3, FIG. 4 does not include device 302f. For example, device 302f may include a pager or another type of device that only supports incoming communications. In other words, device 302f might not support or transmit outgoing communications. Relative to FIG. 3, FIG. 4 includes an additional user device 404. Device 404 may include a microphone or another type of device that only supports outgoing communications. In other words, device 404 might not support or receive incoming communications. Device 404 may be associated with second user Bob Black.

Devices 302a-302e may support bi-directional communications (e.g., devices 302a-302e may support both incoming and outgoing communications).

Table 2 shown below provides an example of user preference categories for Bob Black in connection with the architecture shown in FIG. 4. Referring to Table 2 below, Bob Black may specify how an outgoing communication is to be handled based on preference categories. For example, based on the values shown in Table 2, Bob Black may specify that an outgoing communication originating from device 302d should appear as having been made from phone number XXX-XXX-XXX2 between the hours of 8 AM and 6 PM Monday through Friday, and that an outgoing communication originating from device 302d should appear as having been made from phone number XXX-XXX-XXX3 otherwise. Based on the values shown in Table 2, Bob Black may specify that an outgoing communication originating from device 302e should appear as having been made from phone number XXX-XXX-XXX3 between the hours of 12 AM and 2:45 PM on Saturday, and that an outgoing communication originating from device 302e should appear as having been made from phone number XXX-XXX-XXX2 otherwise. Based on the values shown in Table 2, Bob Black may specify that an outgoing communication originating from device 404 should appear as having been made from phone number XXX-XXX-XXX3. The term 'N/A' shown in Table 2 means 'not applicable.'

TABLE 2

EXAMPLE OUTGOING COMMUNICATION USER PREFERENCES

| | DEVICE | | |
| --- | --- | --- | --- |
| | 302d | 302e | 404 |
| First public phone number? | XXX-XXX-XXX2 | XXX-XXX-XXX3 | XXX-XXX-XXX3 |
| Hours first public phone number is eligible | 8AM-6PM | 12AM-2:45PM | All (12AM-11:59:59PM) |
| Days first public phone number is eligible | Monday-Friday | Saturday | All (Sunday-Saturday) |
| Second public phone number? | XXX-XXX-XXX3 | XXX-XXX-XXX2 | N/A |

Like Table 1 described above, the values shown in Table 2 may be used in connection with a matrix (e.g., matrix 314b). The values shown in Table 2 are illustrative. Other values for Table 2 may be used. Furthermore, the preference categories shown in connection with Table 2 are illustrative. In some embodiments, additional or different preference categories may be used.

Different actions may be taken in response to the values provided for preference categories. For example, in the context of a phone call, an automated voice messaging system may be enabled in response to a call received at a particular time of day or initiated by a particular subset of callers. In an email context, an incoming email may be routed to a particular folder, forwarded to a particular user, and/or a responsive email may be generated and/or sent in reply thereto.

The architectures described above in connection with FIGS. 1-4 are illustrative. In some embodiments, different devices may be used and/or configured to operate in various manners. For example, in some embodiments, a common protocol (e.g., SIP) may be used on a network (e.g., a global IP network) that includes routable/public and non-routable/ private unique identities to route communications (e.g., calls) addressed to or from a public facing identity (e.g., a public facing telephone number). The routing may occur without the use of a box (or other device) that operates in accordance with both a public protocol/routing and a private protocol/routing. In other words, because in some embodiments a common protocol is used throughout, a device might not be used to bridge or interface the different protocols.

Figure 5:
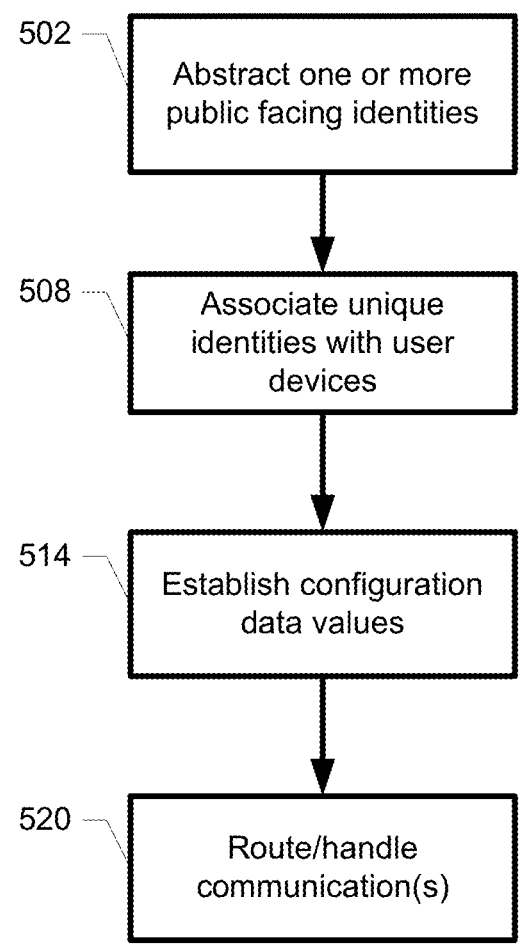
FIG. 5 illustrates a method suitable for demonstrating one or more aspects of this disclosure.

FIG. 5 illustrates a method that may be used to implement one or more aspects of this disclosure. The method of FIG. 5 may be operative on one or more of the architectures or environments described above in connection with FIGS. 1-4. The method of FIG. 5 may be adapted to be operative on alternative environments and architectures.

In step 502, one or more public facing identities (e.g., a public telephone number, an email address, an instant messenger handle, a username or login name, etc.) may be abstracted. The abstracted one or more public facing identities may serve as a representation for communicating (e.g., in an incoming, an outgoing, or in both incoming and outgoing directions) with one or more devices.

In step 508, one or more unique identities may be associated with a corresponding number of user devices. The unique identities may comprise, for example, an alphanumeric identifier and an indication of a service provider.

In step 514, configuration data values may be established for determining how to route or handle communications associated with the user devices. The configuration data values may be based at least in part on default values provided by a network or service provider. The configuration data values may be based at least in part on information, such as preferences, provided by a user.

In step 520, one or more communications may be routed or handled. The routing or handling of step 520 may be based at least in part on the abstracted one or more public facing identities of step 502, the one or more unique identities of step 508, and/or the configuration data values established in step 514. For example, the routing of step 520 may be based on a mapping between the abstracted one or more public facing identities the one or more unique identities, optionally as a function of the configuration data values. An incoming communication may include the abstracted one or more public facing identities and that information may be extracted from the incoming communication and compared against the mapping table to route the incoming communication to a user device. An outgoing communication generated by a user device may include the one or more unique identities, and a substitution or replacement of the one or more unique identities for the abstracted one or more public facing identities may take place using the mapping, such that the outgoing communication is transmitted using the abstracted one or more public facing identities.

The method shown in FIG. 5 (or portions thereof) may execute as part of a loop. Execution as part of a loop may facilitate an adaptive process whereby identities or values may be updated or modified, and a routing or handling of communications may take place in accordance with the modifications.

The method described above in connection with FIG. 5 is illustrative. In some embodiments, the order of the steps (or portions thereof) may be modified from what is shown in FIG. 5. Some of the steps (or portions thereof) may be optional in some embodiments. Additional steps not shown may be included in some embodiments.

In some embodiments, a communication session may be initiated by accessing a routing server or matrix. Based on the establishment of the session, future transactions or communications associated with the session may be routed directly between the communication endpoints (e.g., between user devices, without accessing the routing server/matrix).

While some examples have been described above in the context of telephone and television technology and communications, aspects of this disclosure may readily be applied to, and may be adapted to be operative on, one or more other communication systems. Those communication systems may include computer networks, cellular networks, satellite networks, and the like. In some embodiments, communications may be based on one or more standard, protocols, or the like. For example, communications may be IP-based in some embodiments.

Although not required, various aspects described herein may be embodied as a method, a data processing system, and/or as a transitory and/or non-transitory computer-readable medium storing executable instructions. Accordingly, those aspects may take the form of an entirely hardware embodiment, an entirely software embodiment, an entirely firmware embodiment, or an embodiment combining software, firmware, and/or hardware. The functionality may be resident in a single computing device or application, or may be distributed across multiple computing devices/platforms or applications, the multiple computing devices/platforms optionally being connected to one another via one or more networks. Moreover, the structural components described herein may be distributed amongst one or more devices, optionally within a common housing or casing.

Various signals representing content, data, or events as described herein may be transferred between a source and a destination in the form of electromagnetic waves traveling through signal-conducting media such as metal wires, optical fibers, and/or wireless transmission media (e.g., air and/or space).

The various methods and acts may be operative across one or more computing servers and one or more networks. The functionality may be distributed in any manner, or may be located in a single computing device (e.g., a server, a client computer, etc.).

The methodological acts and processes described herein may be tied to particular machines or apparatuses. For example, as described herein, one or more devices may store information related to one or more public facing identities, one or more unique identities for a corresponding number of user devices, and configuration data for routing/handling communications. More generally, one or more apparatuses may include one or more processors and memory storing instructions that, when executed by the one or more processors, cause the one or more apparatuses to perform the methodological acts and processes described herein. Furthermore, the methodological acts and processes described herein may perform a variety of functions including transforming an article (e.g., a public facing identity) into a different state or thing (e.g., a proxy or representation of a plurality of user devices).

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above in any order. It will also be appreciated and understood that modifications may be made without departing from the true spirit and scope of the present disclosure. The description is thus to be regarded as illustrative instead of restrictive on the present disclosure.

The invention claimed is:

1. A method comprising:
receiving, by a computing device, an incoming communication indicating a first address as a destination of the incoming communication;
causing direction of the incoming communication to one or more devices associated with one or more addresses determined based on a type of the incoming communication, configuration data, and a capability of at least one device associated with the first address, wherein:
the configuration data is based on user preference information associating communication types with addresses; and
the configuration data associates the type of the incoming communication with the one or more addresses; and
causing establishment of a communication session with a device, of the one or more devices, that accepts the incoming communication.

2. The method of claim 1, further comprising:
prior to determining the one or more addresses, determining the capability of the at least one device.

3. The method of claim 1, wherein the one or more addresses is determined based on at least one of:
a social network status;
an online service status;
a schedule;
a status of the at least one device; or
a location of the at least one device.

4. An apparatus comprising:
one or more processors; and
memory storing instructions that, when executed by the one or more processors, cause the apparatus to:
receive an incoming communication indicating a first address as a destination of the incoming communication;
cause direction of the incoming communication to one or more devices associated with one or more addresses determined based on a type of the incoming communication, configuration data, and a capability of at least one device associated with the first address, wherein:
the configuration data is based on user preference information associating communication types with addresses; and
the configuration data associates the type of the incoming communication with the one or more addresses; and
cause establishment of a communication session with a device, of the one or more devices, that accepts the incoming communication.

5. The apparatus of claim 4, wherein the one or more addresses is determined based on at least one of:
a social network status;
an online service status;
a schedule;
a status of the at least one device; or
a location of the at least one device.

6. One or more non-transitory computer-readable media comprising instructions that, when executed, cause a computing device to:
receive an incoming communication indicating a first address as a destination of the incoming communication;
cause direction of the incoming communication to one or more devices associated with one or more addresses determined based on a type of the incoming communication, configuration data, and a capability of at least one device associated with the first address, wherein:
the configuration data is based on user preference information associating communication types with addresses; and
the configuration data associates the type of the incoming communication with the one or more addresses; and
cause establishment of a communication session with a device, of the one or more devices, that accepts the incoming communication.

7. A method comprising:
receiving, by a computing device, a communication associated with a first identity;
causing direction of the communication to one or more devices associated with one or more identities determined based on a type of the communication, configuration data, and a capability of at least one device associated with the first address, wherein:
the configuration data is based on user preference information associating communication types with addresses; and
the configuration data associates the type of the communication with the one or more addresses; and
causing establishment of a communication session with a device, of the one or more devices, that accepts the communication.

8. The method of claim 7, further comprising:
determining a status of a user associated with the first identity or status of any of the one or more devices; and
determining, based on the status of the user associated with the first identity or the status of any of the one or more devices, the one or more identities.

9. The method of claim 1, wherein the first address comprises an address associated with a second computing device different from the computing device.

10. The method of claim 1,
wherein the first address comprises an address of a first device associated with a user, and
wherein the one or more addresses comprises an address of a second device, different from the first device, associated with the user.

11. The method of claim 1,
wherein the one or more addresses is determined based on at least one location associated with the at least one device.

12. The method of claim 1, wherein the incoming communication comprises at least one of:
a telephone call; or
an email.

13. The method of claim 1, wherein the incoming communication comprises a telephone call and the capability of the at least one device comprises an audio capability of the at least one device.

14. The method of claim 1, wherein the capability of the at least one device comprises a quality of an output from the at least one device.

15. The apparatus of claim 4, wherein the incoming communication comprises a telephone call and the capability of the at least one device comprises an audio capability of the at least one device.

16. The apparatus of claim 4, wherein the capability of the at least one device comprises a quality of an output from the at least one device.

17. The one or more non-transitory computer-readable media of claim 6, wherein the incoming communication comprises a telephone call and the capability of the at least one device comprises an audio capability of the at least one device.

18. The one or more non-transitory computer-readable media of claim 6, wherein the capability of the at least one device comprises a quality of an output from the at least one device.

19. The method of claim 7, wherein the communication comprises a telephone call and the capability of the at least one device comprises an audio capability of the at least one device.

20. The method of claim 7, wherein the capability of the at least one device comprises a quality of an output from the at least one device.

* * * * *